US012005863B2

(12) United States Patent
Landwehr

(10) Patent No.: US 12,005,863 B2
(45) Date of Patent: Jun. 11, 2024

(54) CARGO-LOADING DEVICE FOR A VEHICLE

(71) Applicant: Keith Maurice Landwehr, Owensville, MO (US)

(72) Inventor: Keith Maurice Landwehr, Owensville, MO (US)

( * ) Notice: Subject to any disclaimer, the term of this patent is extended or adjusted under 35 U.S.C. 154(b) by 389 days.

(21) Appl. No.: 17/572,887

(22) Filed: Jan. 11, 2022

(65) Prior Publication Data
US 2022/0234513 A1    Jul. 28, 2022

Related U.S. Application Data

(60) Provisional application No. 63/142,369, filed on Jan. 27, 2021.

(51) Int. Cl.
*B60R 9/06* (2006.01)
*B60Q 1/24* (2006.01)

(52) U.S. Cl.
CPC .  *B60R 9/06* (2013.01); *B60Q 1/24* (2013.01)

(58) Field of Classification Search
CPC ...... B64C 23/44; B60P 1/4407; B60P 1/5471; B60R 9/06
See application file for complete search history.

(56) References Cited

U.S. PATENT DOCUMENTS

| 5,540,537 | A  | * | 7/1996 | Welch | B60P 1/5471 |
| | | | | | 224/521 |
| 5,725,112 | A  | * | 3/1998 | Thorby | B66C 23/44 |
| | | | | | 212/238 |
| 6,769,858 | B1 | * | 8/2004 | Butler | B60R 9/06 |
| | | | | | 414/500 |
| 9,254,988 | B1 | * | 2/2016 | Caspersen | B66C 23/44 |
| 10,682,964 | B1 | * | 6/2020 | Turner | B60R 9/06 |
| 2004/0018074 | A1 | * | 1/2004 | Elder | B60P 1/5471 |
| | | | | | 414/462 |

(Continued)

OTHER PUBLICATIONS

Viking Solutions—VKS-VSL001—Swivel Lift—Hitch Mounted Lift System, Retrieved from Internet, Retrieved on Dec. 29, 2020 <URL: https://www.neobits.com/viking_solutions_vks_vsl001_swivelift_hitch_p14905220.html>.

(Continued)

*Primary Examiner* — Kaitlin S Joerger

(57) ABSTRACT

A cargo-loading device for a vehicle is an apparatus that facilitates the transportation of a heavy load. The apparatus minimizes the physical force needed to load and unload the heavy load with a vehicle. The apparatus includes a loading platform, a lifting frame, and a lifting mechanism. The loading platform supports and upholds the heavy load from the ground. The lifting frame connects the loading platform with the vehicle. The lifting mechanism positions and operates the loading platform. Furthermore, the lifting frame includes a support base, and extension arm, a frame boom, a frame jib, and a release pinlock mechanism. The heavy load may be released or unloaded by releasing the hinged connection between the support base and the frame boom with the release pinlock mechanism, the frame boom and the extension arm with a safety pin, or both. The frame jib angles the loading platform with the lifting mechanism.

20 Claims, 6 Drawing Sheets

(56) References Cited

U.S. PATENT DOCUMENTS

2005/0254925 A1* 11/2005 Braquet ............... B60P 1/4492
　　　　　　　　　　　　　　　　　　　　　　414/462
2008/0264990 A1* 10/2008 Riegert .................... B60R 9/06
　　　　　　　　　　　　　　　　　　　　　　224/519
2010/0290876 A1* 11/2010 Conatser ............... B60P 1/4421
　　　　　　　　　　　　　　　　　　　　　　414/471

OTHER PUBLICATIONS

Kill Shot 600 lb. Capacity Hitch-Mounted Deer Hoist & Carrier, Retrieved from Internet, Retrieved on Dec. 29, 2020 <URL: https://www.discountramps.com/hunting/game-carts-hoists/p/DEER-HOIST-CARRIER/>.
500 Lb. Steel Cargo Carrier, Retrieved from Internet, Retrieved on Dec. 29, 2020 <URL: https://www.harborfreight.com/500-lb-capacity-deluxe-cargo-carrier-66983.html>.
Viking Solutions Tilt-N-Go II Universal Hitch Mounted Hauler, Retrieved from Internet, Retrieved on Dec. 29, 2020 <URL: https://www.opticsplanet.com/viking-solutions-tilt-n-go-ii-universal-hitch-mounted-hauler-wagon.html>.
Harmar AL003 Tilt n Tote, Retrieved from Internet, Retrieved on Dec. 29, 2020 <URL: https://www.amazon.com/Harmar-AL003-Tilt-n-Tote/dp/B001DF2MYS>.

* cited by examiner

CARGO-LOADING DEVICE FOR A VEHICLE

The current application claims a priority to the U.S. Provisional Patent application Ser. No. 63/142,369 filed on Jan. 27, 2021.

FIELD OF THE INVENTION

The present invention generally relates to cargo-loading devices. More specifically, the present invention is a cargo-loading device for a vehicle.

BACKGROUND OF THE INVENTION

A lift device for lifting and transporting dead animals is in demand. People use various types of vehicles, including utility terrain vehicles (UTVs) or all-terrain vehicles (ATVs), for hunting, recreation, and work.

UTVs are widely used in a broad range of fields such as distribution, construction, leisure, and agriculture. They are used as a transport means for transporting and carrying soil or crops or carrying tools necessary for various tasks at construction sites or agricultural sites. ATVs are motorized off-highway vehicles useful for transporting people and moderate-sized cargoes to and from hard-to-reach areas.

These vehicles are often specially designed, built, and used more for work than recreation. They allow a rider to travel great distances over a variety of terrain. However, when faced with the need to transport heavy loads great distances over rough terrain, these vehicles require an additional device to load and transport heavy cargo, such as feed, heavy equipment, hunting supplies, and dead animals.

Often, hunters or ATV/UTV users are alone when faced with the need to transport heavy loads over rough terrain at a distance. Accordingly, convenient loading and lifting devices are needed.

Companies have developed various devices for attachment to UTVs and ATVs or truck beds for loading and transporting animals. However, such devices include bulky, mechanically operated mechanisms that can interfere with vehicle operation. Their designs are frequently cumbersome, requiring multiple steps for assembling, adjusting, and repositioning parts.

Some devices may require adjusting the lifting position of the lifting device, hanging tools on mounts, and matching connecting pins with the pinholes in the brackets. Some types of devices require assembling or dismounting multiple connecting pins one by one to attach or detach the lift device. Since such devices include a passive connection structure for connecting and assembling, their users may experience significant inconvenience. The UTV/ATV driver must get off the vehicle and connect or disassemble the lift device by hand, requiring much time and effort. Thus, there is a need to develop a device that solves these problems.

The present invention is intended to address problems associated with and/or otherwise improve on conventional devices through an innovative lift device designed to provide a convenient and effective means for installation on vehicles, including UTVs and ATVs, while incorporating other problem-solving features.

DETAILED DESCRIPTIONS OF THE INVENTION

Figure 1:
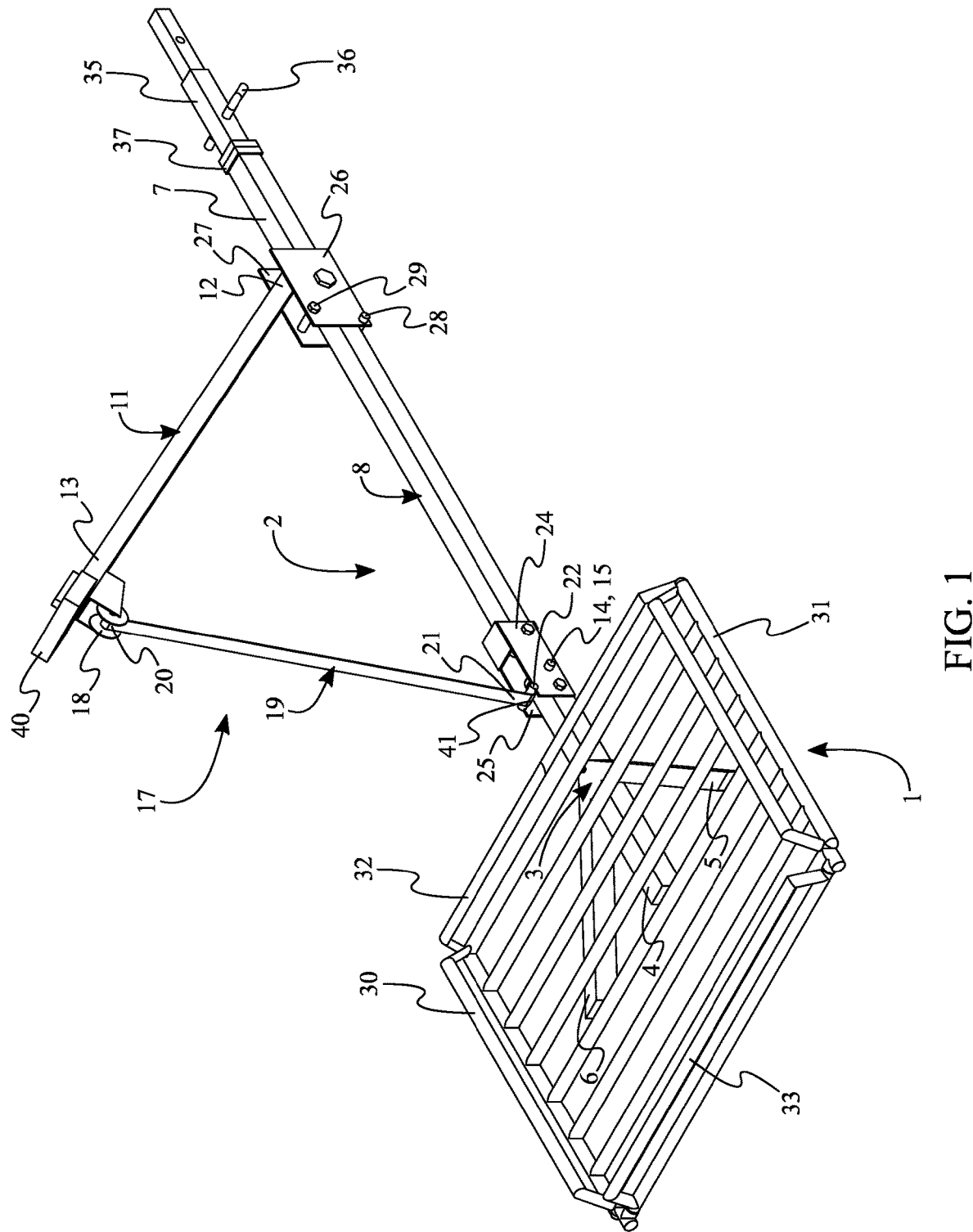
FIG. 1 is a top front perspective view of the present invention with a hitch adapter and a stop collar.

All illustrations of the drawings are for the purpose of describing selected versions of the present invention and are not intended to limit the scope of the present invention.

The present invention is a cargo-loading device for a vehicle. More specifically, the present invention facilitates the transportation of a heavy load such as a harvested deer. The present invention may transport a deer from the woods, or other outdoor area, to a cooler easily without heavy lifting or physical strain. Furthermore, the present invention eliminates any mess within the trunk or back of a vehicle. The present invention remains attached to a vehicle while driven on roads or highways, safely transporting the heavy load to a destination. The present invention may also be utilized to transport coolers, camping equipment, deer stands, trash cans, gardening supplies, and so on. In order for a heavy load to be uplifted from the ground and released from the after transportation, the present invention comprises a loading platform 1, a lifting frame 2, and a lifting mechanism 17, seen in FIG. 1, FIG. 2, FIG. 3, FIG. 4, FIG. 5, and FIG. 6. The loading platform 1 supports and upholds the heavy load or other heavy, cumbersome load. The lifting frame 2 connects and positions the loading platform 1 with a corresponding vehicle. The lifting frame 2 comprises a support base 3, an extension arm 7, a frame boom 8, a frame jib 11, and a release pinlock mechanism 14. The support base 3 connects the loading platform 1 with the lifting frame 2. The extension arm 7 connects the lifting frame 2 with the vehicle. The frame boom 8 extends the support base 3, and consequently the loading platform 1, with the extension arm 7. The frame jib 11 serves as a hoist and is a mount for the lifting mechanism 17. The lifting mechanism 17 angles the support base 3, and again the loading platform 1 as well. Moreover, the lifting mechanism 17 lifts and lowers the support base 3, and consequently the loading platform 1. The lifting mechanism 17 comprises a winch 18, a lifting strap 19, and a bridle 22. The winch 18 retracts and extends the lifting strap 19. In the preferred embodiment of the present invention, the winch 18 is a mechanical winch 18. In alternate embodiments of the present invention, the winch 18 is an electric winch 18. The lifting strap 19 connects to the support base 3 with the bridle 22.

Figure 2:
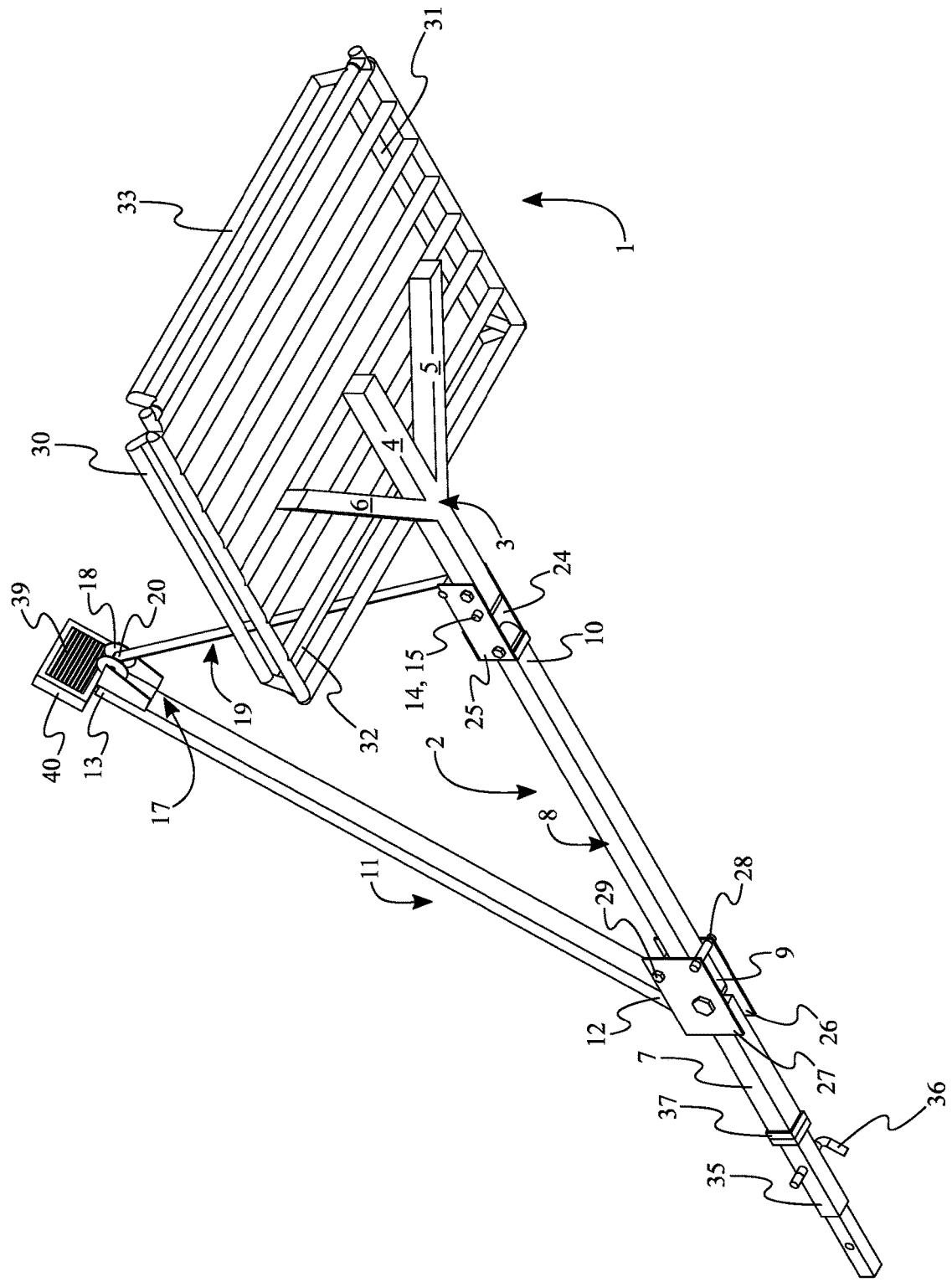
FIG. 2 is a bottom rear perspective view of the present invention with the hitch adapter and the stop collar.
Figure 3:
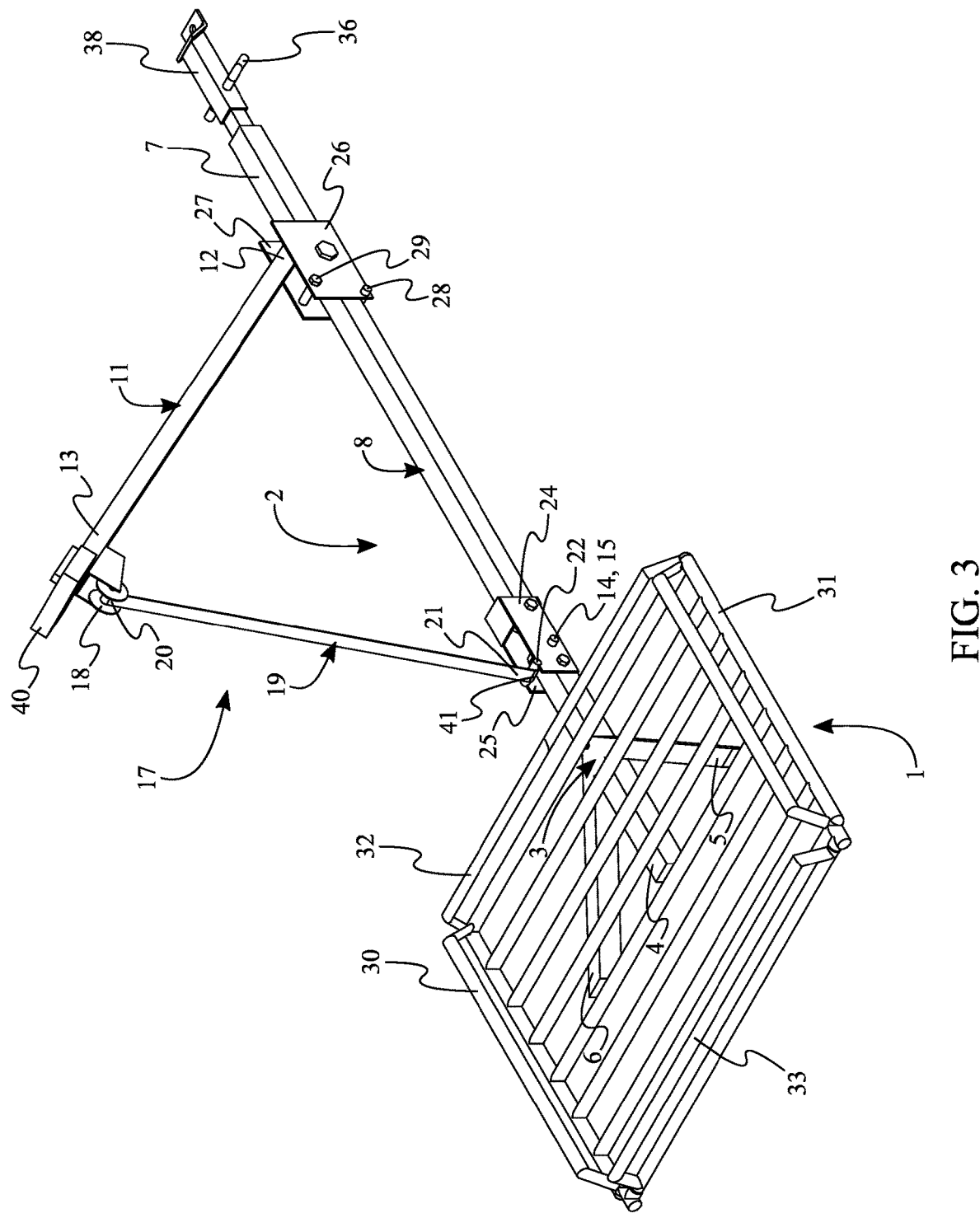
FIG. 3 is a top front perspective view of the present invention with a drawbar.

Furthermore, in order for the lifting frame 2 to structurally sound for heavy loads, the frame boom 8 comprises a proximal boom end 9 and a distal boom end 10, seen in FIG. 2. The proximal boom end 9 attaches the frame boom 8 with the extension arm 7. The distal boom end 10 attaches the support base 3 with the frame boom 8. Similarly, the frame jib 11 comprises a proximal jib end 12 and a distal jib end 13. The proximal jib end 12 attaches the frame jib 11 with the extension arm 7. The distal jib end 13 upholds and offsets the winch 18 from both the support base 3 and the bridle 22.

Figure 4:
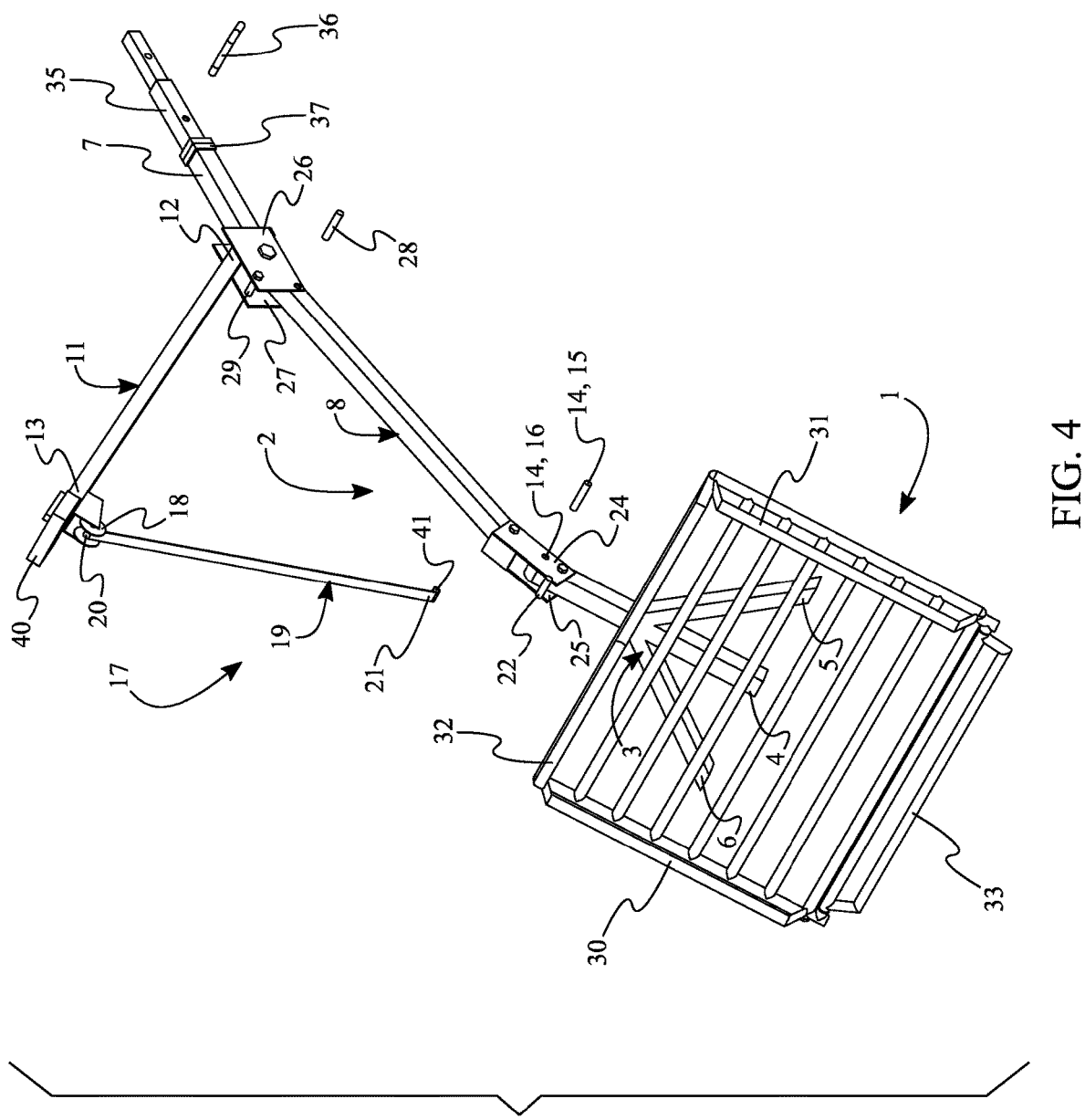
FIG. 4 is a top front perspective view of the present invention with the hitch adapter and the stop collar in a released configuration.
Figure 5:
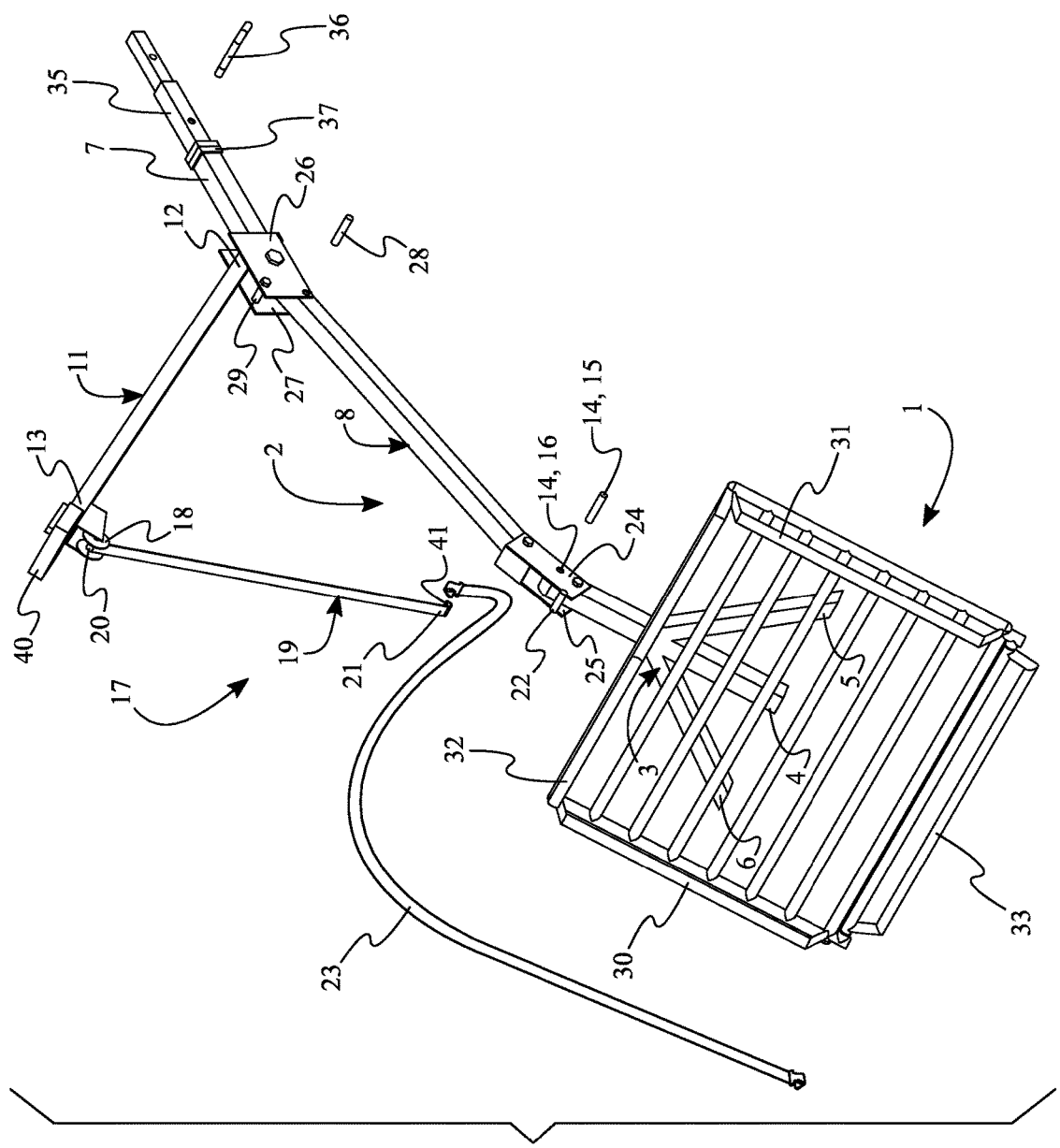
FIG. 5 is a schematic top front perspective view of the present invention with a strap extension in a released configuration.

The overall arrangement of the aforementioned components allows the present invention to support, lift, and release a heavy load regardless of weight or structure. The loading platform 1 is maneuverable as the loading platform 1 is fixed onto the support base 3. As seen in FIG. 4 and FIG. 5, the support base 3 is hingedly mounted with the distal boom end 10, thereby allowing the loading platform 1 to be retracted into a parallel position with the ground and to be released into an angled position with the ground. The weight of the loading platform 1 and a heavy load is effectively supported by the present invention and does not stress the lifting frame 2 as the release pinlock mechanism 14 is operatively integrated between the support base 3 and the distal boom end 10, wherein the release pinlock mechanism 14 is used to selectively unlock the support base 3 from the frame boom 8. This arrangement provides a first means of releasing or dumping the heavy load from the loading platform 1. In order for the loading platform 1 to be lifted and lowered with the ground, the proximal boom end 9 is terminally positioned to the extension arm 7 and is hingedly mounted to the extension arm 7. This arrangement provides a second means of releasing or dumping the heavy load from the loading platform 1. In the preferred use of the present invention, the release pinlock mechanism 14 is first disengaged, then the hinged connection between the frame boom 8 and the extension arm 7 is released. This preferred use is to safely lower the heavy load onto the ground without damaging the present invention or the heavy load itself. The lifting frame 2 is evenly balanced as the proximal jib end 12 is laterally positioned to the extension arm 7, adjacent to the proximal boom end 9. In order for the loading platform 1 to be effectively angled, the proximal jib end 12 is mounted to the extension arm 7, and the distal jib end 13 is oriented away from the extension arm 7. In the preferred embodiment of the present invention the proximal jib end 12 is oriented at an acute angle with the extension arm 7 for maximum weight lift. The winch 18 is offset from the support base 3, and consequently the loading platform 1, as the winch 18 is fixed onto the distal jib end 13. The bridle 22 is fixed onto the support base 3, adjacent with the loading platform 1, thereby allowing the lifting strap 19 to be securely connected with the support base 3. In order for an overall length of the lifting strap 19 between the winch 18 and the bridle 22 to be adjustable, the lifting strap 19 is spooled into the winch 18.

In order for the support base 3 to support the weight of both the loading platform 1 and the heavy load across the loading platform 1, the support base 3 comprises an interfacing tube 4, a first lateral tube 5, and a second lateral tube 6, seen in FIG. 1, FIG. 2, FIG. 3, FIG. 4, FIG. 5, and FIG. 6. The interfacing tube 4 connects both the first lateral tube 5 and the second lateral tube 6 with the frame jib 11. The first lateral tube 5 and the second lateral tube 6 extend across the loading platform 1 and absorb the force of the weight of both the loading platform 1 and the heavy load. In order for the support base 3 to freely hinge with the frame boom 8, the first lateral tube 5 and the second lateral tube 6 is terminally fixed with the interfacing tube 4. The first lateral tube 5 is oriented at an acute angle with the second lateral tube 6, and the interfacing tube 4 is centrally positioned in between the first lateral tube 5 and the second lateral tube 6, thereby evenly balancing the loading platform 1 across the support base 3. Moreover, the distal boom end 10 is terminally positioned with the interfacing tube 4, opposite to the first lateral tube 5 and the second lateral tube 6 as the loading platform 1 rests on the first lateral tube 5 and the second lateral tube 6. The loading platform 1 freely retracts and releases with the frame boom 8 as the distal boom end 10 is hingedly connected to the interfacing tube 4. This arrangement allows the loading platform 1 to be effectively supported while angled accordingly.

In the preferred embodiment of the present invention, the bridle 22 is laterally fixed with the interfacing tube 4, adjacent to the distal boom end 10, seen in FIG. 1, FIG. 3, FIG. 4, FIG. 5, and FIG. 6 This arrangement provides an uninhibited connection between the lifting strap 19 and the bridle 22. The lifting strap 19 remains taught with the bridle 22 while lifting the support base 3 as the bridle 22 is oriented towards the frame jib 11. Similarly, the winch 18 is oriented towards the extension arm 7.

Furthermore, the lifting strap 19 comprises a first strap end 20 and a second strap end 21, seen in FIG. 1, FIG. 2, FIG. 3, FIG. 4, FIG. 5, and FIG. 6. The first strap end 20 is connected into the winch 18, securing the lifting strap 19 around the winch 18. The second strap end 21 attaches with the bridle 22. The lifting mechanism 17 further comprise a load hook 41. The load hook 41 connects and disconnects the lifting strap 19 with the bridle 22. The load hook 41 is connected to the second strap end 21 and is engaged with the bridle 22, providing a secure and releasable connection between the lifting strap 19 and the bridle 22.

In the preferred embodiment of the present invention, the lifting mechanism 17 further comprises a strap extension 23, seen in FIG. 5. The strap extension 23 allows the lifting strap 19 to have a further reach from the loading platform 1. The strap extension 23 is able to be lowered into deep ditches, creeks, or ravines in order to raise and animal out. The strap extension 23 may be utilized to directly connect the lifting strap 19 around a heavy load in order to pull the heavy load towards and closer with the loading platform 1. In order to increase the overall length of the lifting strap 19, the strap extension 23 is attached onto the second strap end 21. In the preferred use of the present invention, the loading platform 1 is lowered to ground level on a bank edge, and the strap extension 23 is lowered and connected around the body of the animal. The lifting strap 19 is retracted with the winch 18, which consequently retracts the strap extension 23 as well. The animal is then pulled out of the deep area and onto the loading platform 1 positioned on top of the bank edge.

In order to reinforce the connection between the support base 3 and the frame boom 8, the present invention further comprises a first structural plate 24 and a second structural plate 25, seen in FIG. 1, FIG. 2, FIG. 3, FIG. 4, FIG. 5, and FIG. 6. The support base 3 is positioned in between the first structural plate 24 and the second structural plate 25 as the first structural plate 24 and the second structural plate 25 are mounted parallel and offset from each other. More specifically, an interfacing tube 4 of the support base 3 is hingedly connected in between the first structural plate 24 and the second structural plate 25. The distal boom end 10 is hingedly connected in between the first structural plate 24 and the second structural plate 25, offset from the interfacing tube 4, thereby preserving hinged connection between the support base 3 and the distal boom end 10. The hinged movement of the distal boom end 10 is preferably restricted between two stops that are positioned perpendicular to the first structural plate 24 and the second structural plate 25, and these two stops can also be used in a leveling feature for the loading platform 1. The connection between the bridle 22 and the lifting strap 19 remains uninhibited as the bridle 22 is connected in between the first structural plate 24 and the second structural plate 25.

In order to lock and unlock the desired angle between the support base 3 and the frame boom 8, the release pinlock mechanism 14 comprises a locking pin 15 and a release pinhole 16, seen in FIG. 4 and FIG. 5. The locking pin 15 secures the position of the interfacing tube 4 between the first structural plate 24 and the second structural plate 25. The release pinhole 16 provides passage for the locking pin 15 through the first structural plate 24, the second structural plate 25, and the interfacing tube 4 while preserving the structural integrity of the first structural plate 24, the second structural plate 25, and the interfacing tube 4. The locking pin 15 engages with the first structural plate 24, the second structural plate 25, and the interfacing tube 4 as the release pinhole 16 traverses through the first structural plate 24, the interfacing tube 4, and the second structural plate 25. The locking pin 15 is engaged through the release pinhole 16, securely locking the interfacing tube 4 between the first structural plate 24 and the second structural plate 25. In the preferred embodiment of the present invention the release pinhole 16 is positioned colinear with the frame boom 8 such that while the locking pin 15 is engaged through the release pinhole 16, the interfacing tube 4 is colinear with the frame boom 8 and the loading platform 1 is parallel with the ground.

In order to reinforce the connection between the frame boom 8 and the extension arm 7, the present invention further comprises a third structural plate 26 and a fourth structural plate 27, seen in FIG. 1, FIG. 2, FIG. 3, FIG. 4, FIG. 5, and FIG. 6. The frame boom 8 is positioned in between the third structural plate 26 and the fourth structural plate 27 as the third structural plate 26 and the fourth structural plate 27 are mounted parallel and offset from each other. More specifically, the proximal boom end 9 is hingedly connected in between the third structural plate 26 and the fourth structural plate 27. The proximal jib end 12 is hingedly connected in between the third structural plate 26 and the fourth structural plate 27, offset from the proximal boom end 9, thereby preserving the hinged connection between the frame boom 8 and the extension arm 7. The extension arm 7 is connected in between the third structural plate 26 and the fourth structural plate 27 as the extension arm 7 remains fixed and connected the frame boom 8 with a corresponding vehicle.

In order to lock and unlock the desired angle between the frame boom 8 and the extension arm 7, the preferred embodiment of the present invention further comprises a safety pin 28 and a stop pin 29, seen in FIG. 1, FIG. 2, FIG. 3, FIG. 4, FIG. 5, and FIG. 6. The safety pin 28 secures the position of the frame boom 8 with the extension arm 7 such that the frame boom 8 rest on the safety pin 28. The stop pin 29 prevents the frame boom 8 from extending past a given angle with the extension arm 7. The stop pin 29 is fixed in between the third structural plate 26 and the fourth structural plate 27, effectively limiting the range of motion for the frame boom 8. In order for a desired angle of the frame boom 8 to be locked, the safety pin 28 is releasably attached through the third structural plate 26 and the fourth structural plate 27. The frame boom 8 is positioned in between the safety pin 28 and the stop pin 29, upholding the frame boom 8 with the extension arm 7 and uplifting the loading platform 1 from the ground.

A heavy load remains on the loading platform 1 throughout transportation as the present invention further comprises a first widthwise rail 30, a second widthwise rail 31, and a first lengthwise rail 32, seen in FIG. 1, FIG. 2, FIG. 3, FIG. 4, FIG. 5, and FIG. 6. The first widthwise rail 30, the second widthwise rail 31, and the first lengthwise rail 32 prevent the heavy load from slipping past the sides and behind the loading platform 1. In order to create a frame around the loading platform 1, the first widthwise rail 30 and the second widthwise rail 31 are positioned parallel to the frame boom 8. Moreover, the first lengthwise rail 32 is positioned perpendicular to the frame boom 8, adjacent to the support base 3. This arrangement provides a clear entrance for the heavy load onto the loading platform 1. The heavy load may lay flat on the loading platform 1 as the first widthwise rail 30, the second widthwise rail 31, and the first lengthwise rail 32 are peripherally connected onto the loading platform 1, opposite the support base 3. In the preferred embodiment of the present invention, the first widthwise rail 30, the second widthwise rail 31, and the first lengthwise rail 32 are fixed with the loading platform 1. In alternate embodiments of the present invention, the first widthwise rail 30, the second widthwise rail 31, and the first lengthwise rail 32 are removably attached with the loading platform 1 so that the heavy load or other heavy loads may be easily positioned onto or take off the loading platform 1.

Further embodiments of the present invention comprise a second lengthwise rail 33, also seen in FIG. 1, FIG. 2, FIG. 3, FIG. 4, FIG. 5, and FIG. 6. The second lengthwise rail 33 serves as a gate for with the loading platform 1, further securing a heavy load on the loading platform 1 throughout transportation. The second lengthwise rail 33 fully encloses the loading platform 1 as the second lengthwise rail 33 is positioned opposite to the first lengthwise rail 32 across the loading platform 1. In to facilitate the placement of the heavy load onto the loading platform 1, the second lengthwise rail 33 is hingedly connected onto the loading platform 1, opposite the support base 3, thereby allowing the second lengthwise rail 33 to flip open and flip close. It is understood that a variety of hinges and fasteners may be integrated with the second lengthwise rail 33 to reinforce the closed configuration between the second lengthwise rail 33 and both the first widthwise rail 30 and the second widthwise rail 31.

Further embodiments of the present invention may comprise a plurality of reflectors. The plurality of reflectors visually notifies individuals around or nearby the loading platform 1 of the loading platform 1 at night or in low-visibility environments. The plurality of reflectors is externally positioned with the loading platform 1 in order for the plurality of reflectors to reflect light. Furthermore, the plurality of reflectors is peripherally fixed around the loading platform 1.

Figure 6:
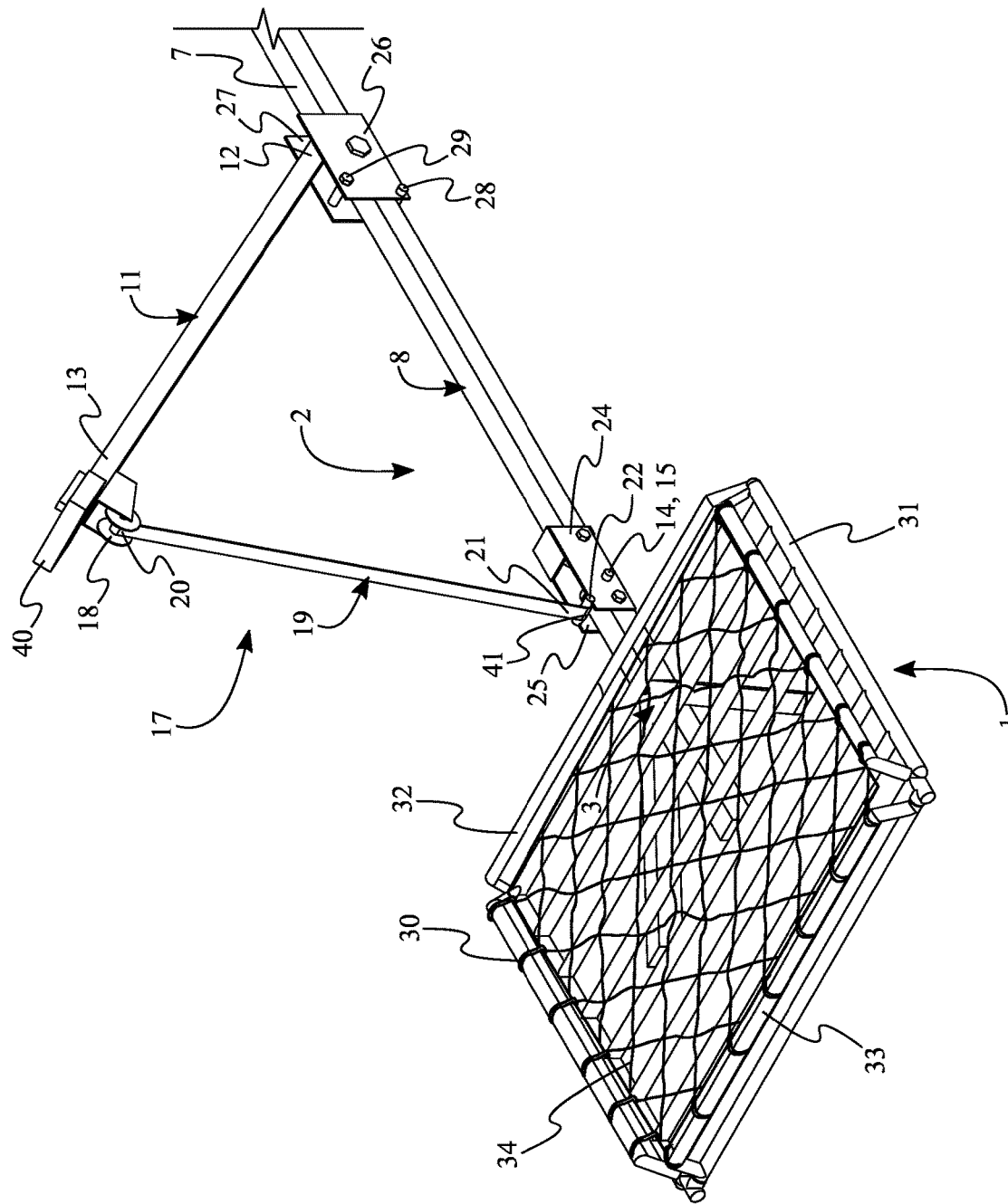
FIG. 6 is a top front perspective view of the present invention with a bungee cord engaged with a loading platform.

Further embodiments of the present invention comprise a bungee-cargo net 34, seen in FIG. 6. The bungee-cargo net 34 limits any bouncing or vertical movement of a heavy load from the loading platform 1. The bungee-cargo net 34 serves as a flexible cover for the loading platform 1. The bungee-cargo net 34 is perimetrically connected with the loading platform 1 in order to prevent the heavy load from bouncing off the loading platform 1 throughout transportation. The bungee-cargo net 34 may further comprise a plurality of hooks that releasably attach the bungee-cargo net 34 around the loading platform 1.

Further embodiments of the present invention comprise a hitch adapter 35, a hitch pin 36, and a stop collar 37, seen in FIG. 1, FIG. 2, FIG. 4, and FIG. 5. The hitch adapter 35 provides a secure connection between the extension arm 7 and the hitch of a vehicle such as a truck. The hitch pin 36 connects the stop collar 37 with the hitch adapter 35. The stop collar 37 facilitates the alignment of the hitch pin 36 with a corresponding hole of the hitch adapter 35 each time the present invention is attached with the vehicle. In order for the hitch adapter 35 to be positioned adjacent with the hitch of the vehicle, the hitch adapter 35 is terminally fixed with the extension arm 7, opposite the support base 3. Furthermore, the stop collar 37 is laterally connected around the extension arm 7, adjacent with the hitch adapter 35. In order for the extension arm 7 to be connected and released with the hitch adapter 35 while the hitch adapter 35 remains connected with the vehicle, the extension arm 7 is operatively coupled with the hitch adapter 35 by the hitch pin 36, wherein the hitch pin 36 is used to selectively couple the extension arm 7 to the hitch adapter 35. Further embodiments of the present invention comprise a drawbar 38. The drawbar 38 allows the extension arm 7 extends the connection between the extension arm 7 and the vehicle. The drawbar 38 is terminally mounted with the extension arm 7, opposite the frame boom 8, in order to freely connect with the vehicle.

Further embodiments of the present invention comprise an illumination device 39 and a rigid casing 40, seen in FIG. 1, FIG. 2, FIG. 3, FIG. 4, and FIG. 5. The illumination device 39 directs light towards the loading platform 1 for increased visibility at night or in low-visibility environments. The rigid casing 40 protects and houses the illumination device 39. Moreover, the rigid casing 40 is externally mounted about the illumination device 39. In order for the illumination device 39 to be safely positioned around the loading platform 1, the illumination device 39 is laterally mounted to the frame jib 11, adjacent to the distal jib end 13. More specifically, the illumination device 39 is positioned opposite the winch 18 about the frame jib 11. A user may easily see the loading platform 1 and the nearby surrounding area of the loading platform 1 as the illumination device 39 is oriented towards the loading platform 1, facilitating the placement and removal of a heavy load with the loading platform 1.

Although the invention has been explained in relation to its preferred embodiment, it is to be understood that many other possible modifications and variations can be made without departing from the spirit and scope of the invention as hereinafter claimed.

What is claimed is:

1. A cargo-loading device for a vehicle comprising:
   a loading platform;
   a lifting frame;
   a lifting mechanism;
   the lifting frame comprising a support base, an extension arm, a frame boom, a frame jib, and a release pinlock mechanism;
   the lifting mechanism comprising a winch, a lifting strap, and a bridle;
   the frame boom comprising a proximal boom end and a distal boom end;
   the frame jib comprising a proximal jib end and a distal jib end;
   the loading platform being fixed onto the support base;
   the support base being hingedly mounted with the distal boom end;
   the release pinlock mechanism being operatively integrated between the support base and the distal boom end, wherein the release pinlock mechanism is used to selectively unlock the support base from the frame boom;
   the proximal boom end being terminally positioned to the extension arm;
   the proximal boom end being hingedly mounted to the extension arm;
   the proximal jib end being laterally positioned to the extension arm, adjacent to the proximal boom end;
   the proximal jib end being mounted to the extension arm;
   the distal jib end being oriented away from the extension arm;
   the winch being fixed onto the distal jib end;
   the bridle being fixed onto the support base, adjacent with the loading platform; and,
   the lifting strap being spooled into the winch.

2. The cargo-loading device for a vehicle as claimed in claim 1 comprising:
   the support base comprising an interfacing tube, a first lateral tube, and a second lateral tube;
   the first lateral tube and the second lateral tube being terminally fixed with the interfacing tube;
   the first lateral tube being oriented at an acute angle with the second lateral tube;
   the interfacing tube being centrally positioned in between the first lateral tube and the second lateral tube;
   the distal boom end being terminally positioned with the interfacing tube, opposite to the first lateral tube and the second lateral tube; and,
   the distal boom end being hingedly connected to the interfacing tube.

3. The cargo-loading device for a vehicle as claimed in claim 2 comprising:
   the bridle being laterally fixed with the interfacing tube, adjacent to the distal boom end;
   the bridle being oriented towards the frame jib; and,
   the winch being oriented towards the extension arm.

4. The cargo-loading device for a vehicle as claimed in claim 1 comprising:
   the lifting strap comprising a first strap end and a second strap end; and,
   the first strap end being connected into the winch.

5. The cargo-loading device for a vehicle as claimed in claim 4 comprising:
   the lifting mechanism further comprising a load hook;
   the load hook being connected onto the second strap end; and,
   the load hook being engaged with the bridle.

6. The cargo-loading device for a vehicle as claimed in claim 4 comprising:
   the lifting mechanism further comprising a strap extension; and,
   the strap extension being attached onto the second strap end.

7. The cargo-loading device for a vehicle as claimed in claim 1, wherein the winch is a mechanical winch.

8. The cargo-loading device for a vehicle as claimed in claim 1, wherein the winch is an electric winch.

9. The cargo-loading device for a vehicle as claimed in claim 1 comprising:
   a first structural plate;
   a second structural plate;
   the first structural plate and the second structural plate being mounted parallel and offset from each other;
   an interfacing tube of the support base being hingedly connected in between the first structural plate and the second structural plate;
   the distal boom end being hingedly connected in between the first structural plate and the second structural plate, offset from the interfacing tube; and,
   the bridle being connected in between the first structural plate and the second structural plate.

10. The cargo-loading device for a vehicle as claimed in claim 9 comprising:
    the release pinlock mechanism comprising a locking pin and a release pinhole;

the release pinhole traversing through the first structural plate, the interfacing tube, and the second structural plate; and, the locking pin being engaged through the release pinhole.

11. The cargo-loading device for a vehicle as claimed in claim 1 comprising:
a third structural plate;
a fourth structural plate;
the third structural plate and the fourth structural plate being mounted parallel and offset from each other;
the proximal boom end being hingedly connected in between the third structural plate and the fourth structural plate;
the proximal jib end being hingedly connected in between the third structural plate and the fourth structural plate, offset from the proximal boom end; and,
the extension arm being connected in between the third structural plate and the fourth structural plate.

12. The cargo-loading device for a vehicle as claimed in claim 11 comprising:
a safety pin;
a stop pin;
the stop pin being fixed in between the third structural plate and the fourth structural plate;
the safety pin being releasably attached through the third structural plate and the fourth structural plate; and,
the frame boom being positioned in between the safety pin and the stop pin.

13. The cargo-loading device for a vehicle as claimed in claim 1 comprising:
a first widthwise rail;
a second widthwise rail;
a first lengthwise rail;
the first widthwise rail and the second widthwise rail being positioned parallel to the frame boom;
the first lengthwise rail being positioned perpendicular to the to frame boom, adjacent to the support base; and,
the first widthwise rail, the second widthwise rail, and the first lengthwise rail being peripherally connected onto the loading platform, opposite the support base.

14. The cargo-loading device for a vehicle as claimed in claim 13 comprising:
the first widthwise rail, the second widthwise rail, and the first lengthwise rail being fixed with the loading platform.

15. The cargo-loading device for a vehicle as claimed in claim 13 comprising:
the first widthwise rail, the second widthwise rail, the first lengthwise rail being removably attached with the loading platform.

16. The cargo-loading device for a vehicle as claimed in claim 13 comprising:
a second lengthwise rail;
the second lengthwise rail being positioned opposite the first lengthwise rail across the loading platform; and,
the second lengthwise rail being hingedly connected onto the loading platform, opposite the support base.

17. The cargo-loading device for a vehicle as claimed in claim 1 comprising:
a bungee-cargo net;
the bungee-cargo net being perimetrically connected with the loading platform.

18. The cargo-loading device for a vehicle as claimed in claim 1 comprising:
a hitch adapter;
a hitch pin;
a stop collar;
the hitch adapter being terminally fixed with the extension arm, opposite the support base;
the stop collar being laterally connected around the extension arm, adjacent with the hitch adapter; and,
the extension arm being operatively coupled with the hitch adapter by the hitch pin, wherein the hitch pin is used to selectively couple the extension arm to the hitch adapter.

19. The cargo-loading device for a vehicle as claimed in claim 1 comprising:
a drawbar; and,
the drawbar being terminally mounted with the extension arm, opposite the frame boom.

20. The cargo-loading device for a vehicle as claimed in claim 1 comprising:
an illumination device;
a rigid casing;
the rigid casing being externally mounted about the illumination device;
the illumination device being laterally mounted to the frame jib, adjacent to the distal jib end;
the illumination device being positioned opposite the winch about the frame jib; and,
the illumination device being oriented towards the loading platform.

* * * * *